(12) United States Patent
Pietras

(10) Patent No.: US 8,783,133 B2
(45) Date of Patent: Jul. 22, 2014

(54) SEAL PROTECTOR ASSEMBLY

(75) Inventor: Kelly Pietras, Oakland Township, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 258 days.

(21) Appl. No.: 12/974,955

(22) Filed: Dec. 21, 2010

(65) Prior Publication Data

US 2011/0185844 A1 Aug. 4, 2011

Related U.S. Application Data

(60) Provisional application No. 61/299,770, filed on Jan. 29, 2010.

(51) Int. Cl.
*G05G 25/04* (2006.01)

(52) U.S. Cl.
USPC .......................................................... 74/609

(58) Field of Classification Search
USPC ........... 74/608, 609; 403/11, 12, 13; 277/370, 277/375, 549
See application file for complete search history.

(56) References Cited

U.S. PATENT DOCUMENTS

| | | | |
|---|---|---|---|
| 3,710,989 A * | 1/1973 | Armour | 222/562 |
| 4,002,275 A * | 1/1977 | Crowle et al. | 222/543 |
| 4,815,884 A * | 3/1989 | Halliday et al. | 403/13 |
| 7,284,759 B2 * | 10/2007 | Heldmann et al. | 277/351 |
| 2004/0182198 A1 * | 9/2004 | Marich | 74/606 R |
| 2009/0120940 A1 | 5/2009 | Shah | |

* cited by examiner

*Primary Examiner* — Vicky Johnson

(57) ABSTRACT

A seal protector assembly is provided. The seal protector assembly includes an expandable cylinder for protecting a seal. A plug or cap is removably attached to the expandable cylinder. After shipment of the transmission, the plug or cap is removed. Once any potential damage to the seal during assembly has passed, the expandable cylinder is then removed.

19 Claims, 6 Drawing Sheets

US 8,783,133 B2

SEAL PROTECTOR ASSEMBLY

CROSS-REFERENCE

This application claims priority to U.S. Provisional Application No. 61/299,770, filed on Jan. 29, 2010, which is hereby incorporated in its entirety herein by reference.

TECHNICAL FIELD

The invention relates to a seal protector assembly operable to protect a seal during shipping and assembly, and more particularly a seal protector assembly that protects a seal attached to a transmission.

BACKGROUND

A typical multi-speed transmission uses a combination of torque transmitting devices, gear sets, and shafts controlled by an electro-hydraulic control system to provide a plurality of forward and reverse gear ratios for a motor vehicle. These components are encased within a protective transmission case or housing. During assembly of the motor vehicle, the transmission is shipped and washed prior to installation. Accordingly, openings must be sealed during shipment in order to prevent debris from entering the transmission and to prevent water from entering the transmission during washing. In addition, it is desirable to protect exposed components, such as rubber seals, that can be damaged during shipment or installation of the transmission.

For example, a typical transmission includes an opening for receiving an axle shaft that connects the output of the engine to the input of the transmission. The opening includes an axial seal that seals the transmission once the axle shaft has been installed. However, the typical axle shaft includes a splined end that is inserted into the opening of the transmission. This splined end can damage the axle seal that surrounds the opening, thereby leading to axle seal leaks that can damage the transmission. Accordingly, there is a need for a seal protector assembly that protects the transmission and the seal from damage during transportation and during installation, while remaining easy to remove during assembly.

SUMMARY

A seal protector assembly is provided. The seal protector assembly includes an expandable cylinder for protecting a seal. A plug or cap is removably attached to the expandable cylinder. After shipment of the transmission, the plug or cap is removed. Once any potential damage to the seal during assembly has passed, the expandable cylinder is then removed.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
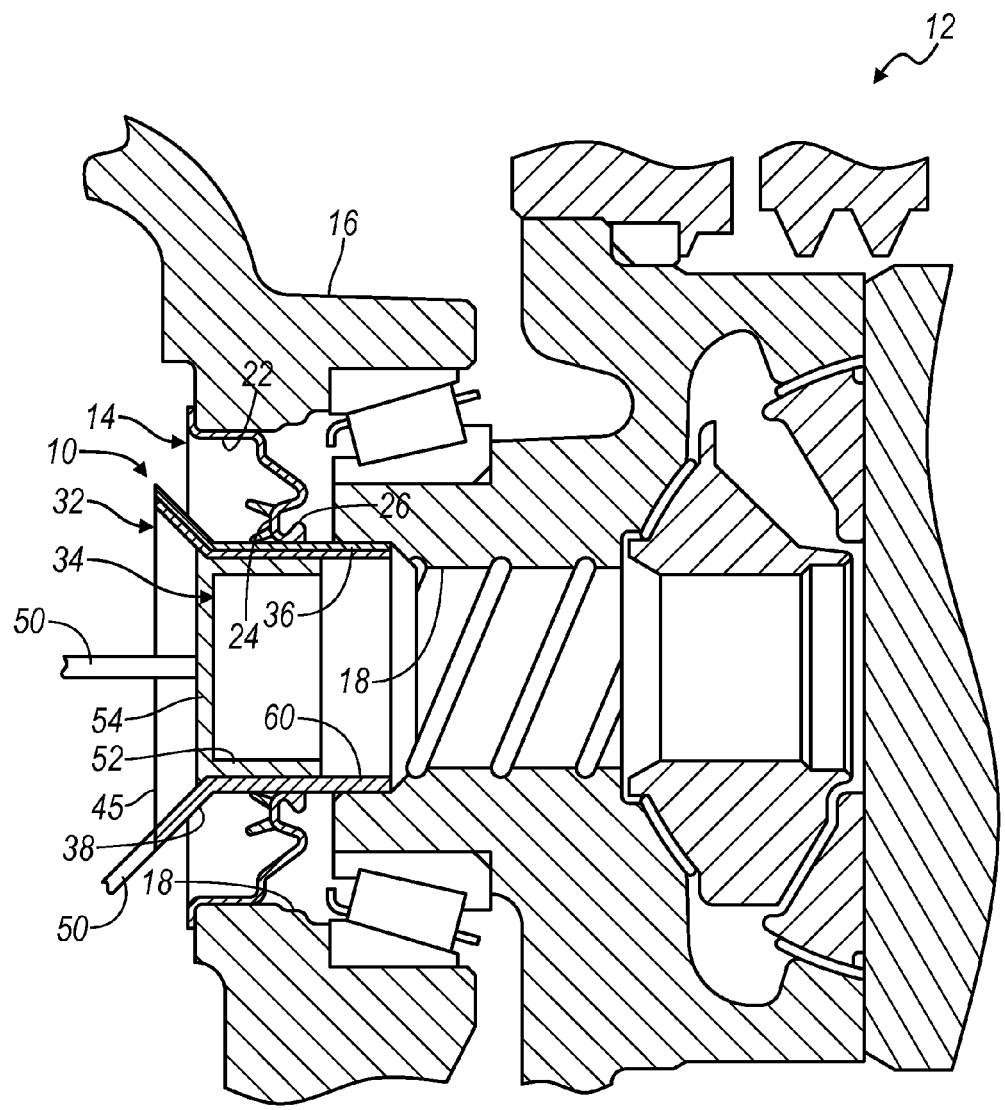
FIG. 1 is a cross-sectional view of a seal protector assembly according to the principles of the present invention shown in use with an exemplary axle seal and a portion of an exemplary transmission.

With reference to FIG. 1 a seal protector assembly according to the principles of the present invention is generally indicated by reference number 10. The seal protector assembly 10 is shown in use with an exemplary transmission 12 having an exemplary axle seal 14. The transmission 12 includes a typically cast, metal housing or case 16 which encloses and protects the various components of the transmission 12. The housing 16 includes a variety of apertures, passageways, shoulders and flanges which position and support these components. In particular, the housing 16 defines an input opening 18 that receives an axle shaft or other input from an engine (not shown) of the motor vehicle. It should be appreciated that the transmission 12 may be, for example, a front wheel drive transmission, a rear wheel drive transmission, a dual clutch transmission, a hybrid transmission, or any other type of transmission without departing from the scope of the present invention.

The axle seal 14 is annular and includes a metal flange 22 press fit or otherwise attached to the transmission housing 16. The flange 22 extends radially inwardly and terminates in a distal end 24. A rubber seal 26 is connected to the distal end 24 of the flange 22. The rubber seal 26 is operable to seal against an axle shaft or other component, as will be described in greater detail below, to prevent oil leakage out of the transmission 12 during operation of the motor vehicle. It should be appreciated that the shape of the axial seal 14 and the specific configuration and materials used may vary without departing from the scope of the present invention.

The seal protector assembly 10 is operable to close and seal the opening 18 to the transmission 12 during shipment and preparation of the transmission 12 and to protect the rubber seal 26 during assembly of the transmission 12 within the motor vehicle. With combined reference to FIGS. 2-4, the seal protector assembly 10 includes a seal protector 32 and a plug or cap 34. The seal protector 32 includes a cylindrical portion 36 and a guide portion 38. The cylindrical portion 36 is hollow and includes a first end 40 and a second end 42 opposite the first end 40. The first end 40 is open and defines a first aperture 41. The guide portion 38 is integrally formed or otherwise connected with the second end 42 of the cylindrical portion 36. The cylindrical portion 36 is preferably axially tapered such that end 40 has a smaller diameter than end 42. The guide portion 38 is also hollow and has an inner diameter that increases relative to the cylindrical portion 36 as the guide portion 38 extends axially from the cylindrical portion 36. The inner surfaces or inner diameters of the cylindrical portion 36 and the guide portion 38 define a cavity 44, best seen in FIGS. 3 and 4. The guide portion 38 has an open end that defines a second aperture 45.

Figure 3:
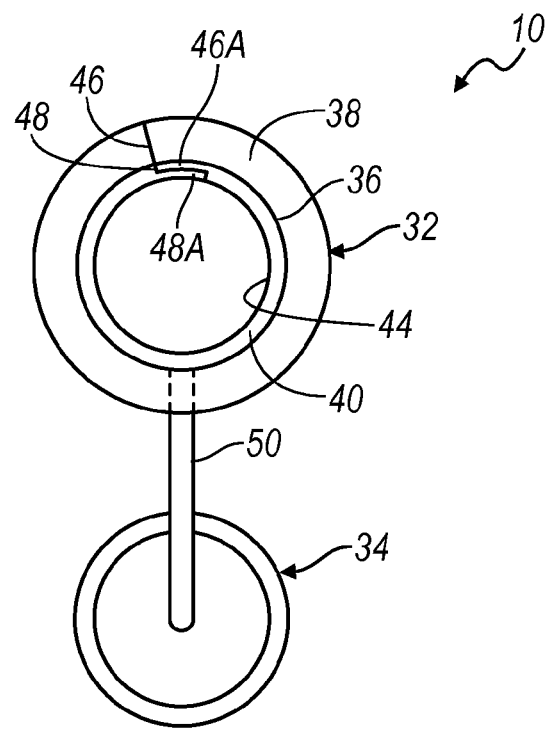
FIG. 3 is a front view of the seal protector assembly viewed in the direction of arrow 3-3 in FIG. 2.
Figure 4:
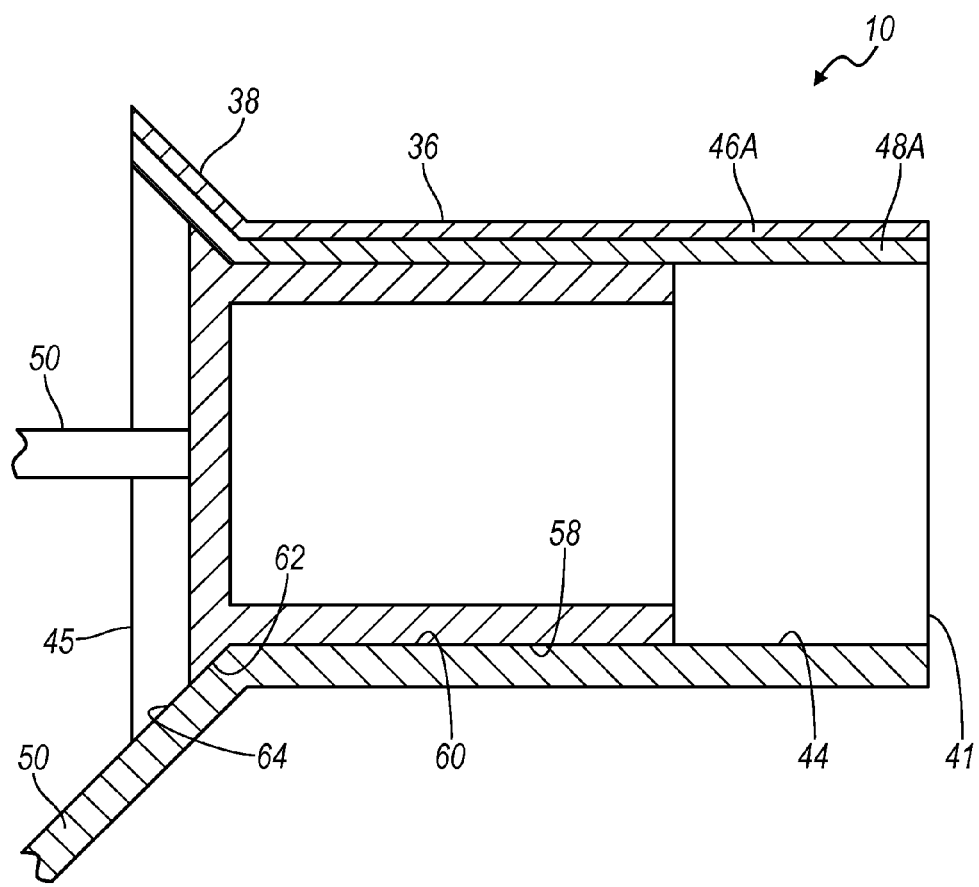
FIG. 4 is a cross-sectional view of the seal protector assembly with a plug installed.

The seal protector 32 is divided or separated axially and includes a first side 46 and a second side 48, best seen in FIGS. 3 and 4. The first side 46 and second side 48 have thinned portions 46A and 48A, respectively, that overlap with one another to form the cylindrical shape of the seal protector 32. The cross-section of the thinned portions 46A and 48B may vary without departing from the scope of the present invention. For example, the thinned portions 46A and 46B may be tapered. The location of the thinned portions 46A and 48A when overlapped is preferably directly opposite the location of the tether 50 used to pull the seal protector 32 out of the transmission 12.

The plug 34 is connected with the seal protector via the tether 50. The tether 50 is connected at one end with the guide portion 38 of the seal protector 32 and is connected at an opposite end with the plug 34. In a preferred embodiment, the tether 50 is integrally formed from the guide portion. The tether 50 is preferably comprised of a flexible yet strong material, such as plastic, though other materials may be employed without departing from the scope of the present invention.

The plug 34 includes a cylindrical body 52 and an end cap 54. The cylindrical body 52 has a first end 54 and a second end 56 opposite the first end 54. The end cap 54 is integrally formed or otherwise connected to the cylindrical body 34 at the second end 56. The end cap 54 has an outer diameter that increases relative to the cylindrical body 52 in an axial direction away from the cylindrical body 52. While the cylindrical body 52 is illustrated as being hollow with the first end 54 open and the end cap 54 is solid, it should be appreciated that the cylindrical body 52 may be solid and the end cap 54 hollow without departing from the scope of the present invention, so long as the plug 34 is operable to seal the cavity 44 of the seal protector 32.

The plug 34 is removably insertable within the cavity 44 of the seal protector 32, as shown in FIGS. 3 and 4. The cylindrical body 52 of the plug 34 has an outer surface 58 having an outer diameter that is greater than the inner diameter of an inner surface 60 of the cylindrical portion 36 of the seal protector 32. Accordingly, when the plug 34 is inserted within the seal protector 32, the plug 34 forces the seal protector 32 to expand outward by reducing the overlap of the thin portions 46A and 48A. The thin portions 46A and 48A may be heat treated to form a breakable connection between the thin portions 46A and 48A without departing from the scope of the present invention. The end cap 54 has an outer surface 62 having an outer diameter that approximately matches an inner diameter of an inner surface 64 of the guide portion 38.

In the example provided, the seal protector 32, the plug 34, and the tether 50 are formed as a unitary plastic component. The seal protector 32, the plug 34 and the tether 50 may be created using known injection molding techniques. It should be appreciated, however, that the seal protector 32, the plug 34, and the tether 50 may be made of different materials, in different manners, and from separate pieces without departing from the scope of the present invention.

Figure 6A:
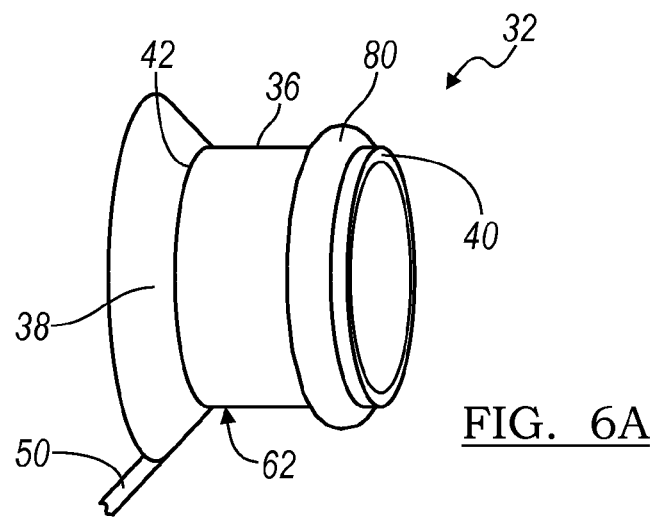
FIG. 6A is a side perspective view of an alternate embodiment of the seal protector assembly.

Turning to FIG. 6A, the seal protector 10 may further include a retention feature 80. The retention feature 80 is disposed proximate the first end 40 on an outer surface 82 of the cylindrical portion 36. The retention feature 80 has a substantially rounded cross-sectional area and extends circumferentially around the cylindrical portion 36. When the seal protector 10 is disposed within the opening 18, the retention feature 80 moves past the seal 22 and is operable to retain the seal protector 80 within the opening 18. Alternatively, the retention feature 80 may be a discrete or a plurality of discrete protrusions located on the outer surface 82 proximate the end 40.

Figure 6B:
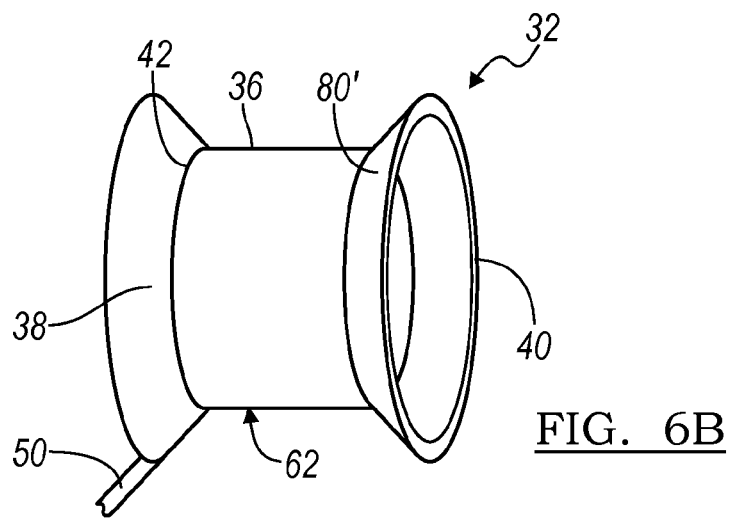
FIG. 6B is a side perspective view of another alternate embodiment of the seal protector assembly.

With reference to FIG. 6B, an alternate retention feature 80' is shown. The retention feature 80' is an angled flange that extends axially and radially out from the first end 40. The retention feature 80' operates in a manner similar to that of the retention feature 80.

Figure 7:
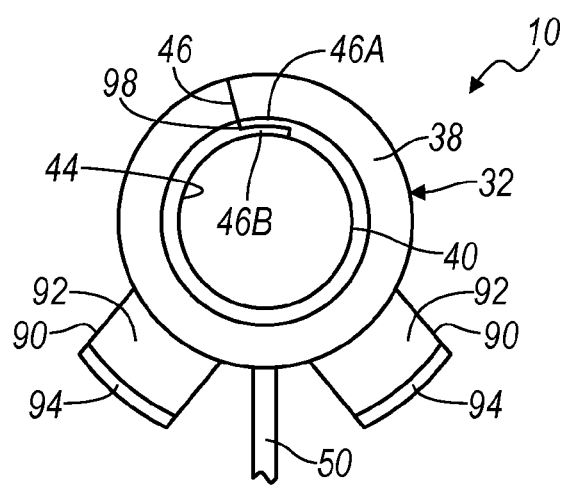
FIG. 7 is a side perspective view of another alternate embodiment of the seal protector assembly.
Figure 8:
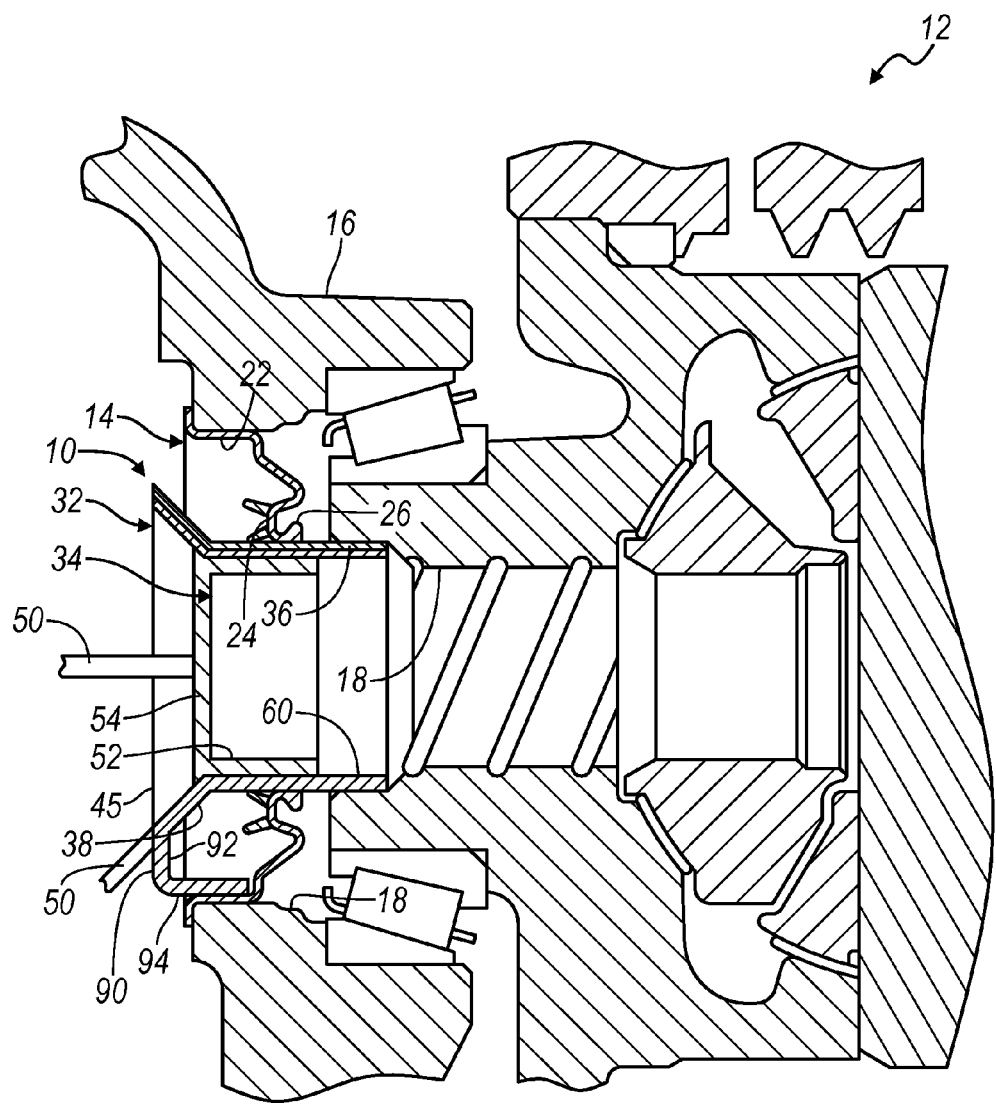
FIG. 8 is a sectional view of another alternate seal protector assembly shown in use with an exemplary axle seal and a portion of an exemplary transmission.

With reference to FIGS. 7 and 8, the seal protector 10 may further include one or more limit flanges 90. The limit flange 90 is connected to an end of the guide portion 38 and includes a radially extending portion 92 and an axially extending portion 94 disposed at a distal end of the radially extending portion 92. As shown in FIG. 8, the limit flange 90 is configured to contact the seal 22 radially, and optionally axially, outboard of the transmission 12 in order to limit how far the seal protector 10 may be inserted into the opening 18 and to limit the compression of the seal 22 in a radial direction upon insertion of the shaft 70. The limit flange 90 is preferably designed to contact the metal flange 24 of the seal 22.

Figure 2:
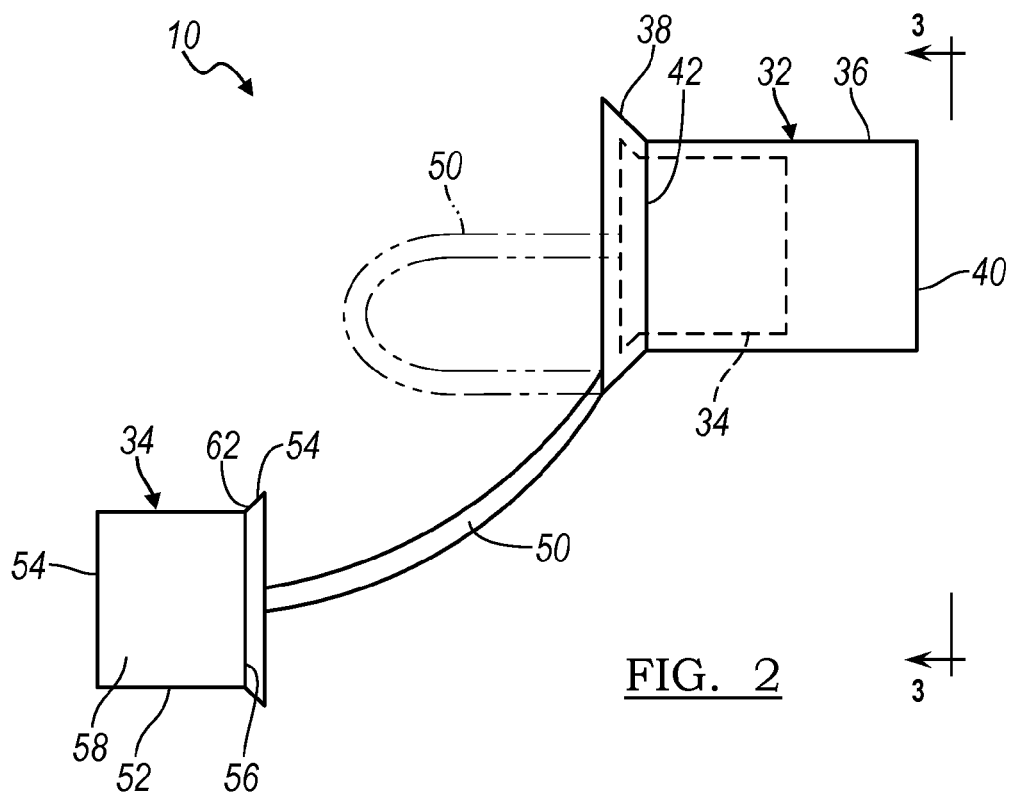
FIG. 2 is a side view of the seal protector assembly.

Returning to FIG. 1 and with continued reference to FIGS. 2-4, during shipment or storage of the transmission 12, the seal protector 32 is inserted into the opening 18 such that the cylindrical portion 36 is disposed between the rubber seal portion 26 of the seal 14. The guide portion 38 is preferably at least partially disposed outside the transmission housing 16. The plug 34 is press fit into the seal protector 32. As noted above, the larger diameter of the plug 34 radially expands the seal protector 32 such that the outer surface of the cylindrical portion 36 seals to the rubber seal portion 26 of the seal 14. The plug 34 has an axial length that is sufficient to assure that the cylindrical body 52 of the plug 34 is disposed in radial alignment with the seal 14 when fully installed in order to assure the seal protector 32 seals to the seal 14 due to radial expansion. The seal protector assembly 10 assures that the opening 18 is sealed from penetration of fluid or debris during shipment and/or processing of the transmission 12.

Figure 5:
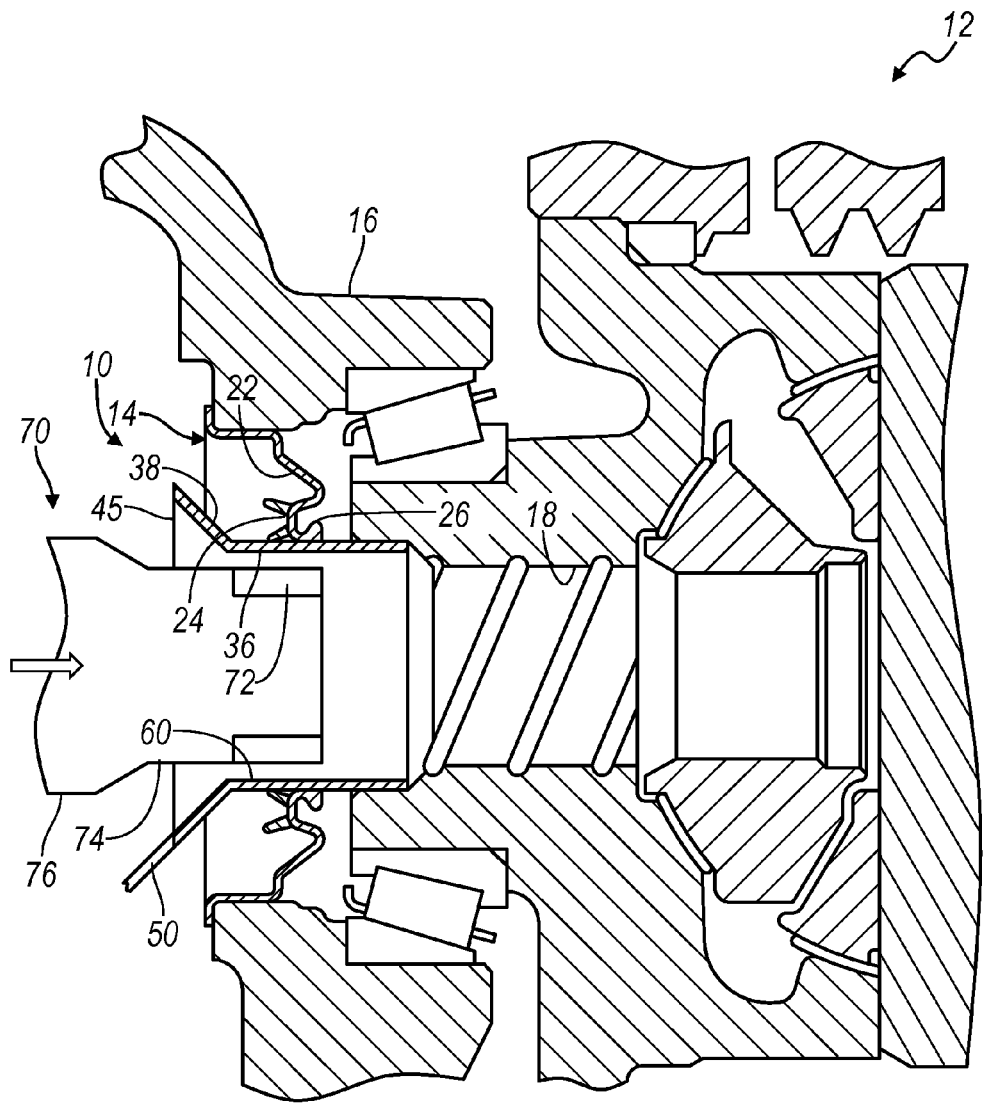
FIG. 5 is a cross-sectional view of a portion of a transmission having an axle seal with a portion of the seal protector assembly removed during installation of an axle shaft.

In order to assemble the transmission 12 with the motor vehicle, the plug 34 is removed, thereby revealing the aperture 45 in the seal protector 32 that communicates with the opening 18 in the transmission 12. The force required to remove the plug 34 is less than the force required to remove the seal protector 32, therefore the seal protector 32 remains in place. Turning to FIG. 5, once the plug 34 has been removed, an axle shaft 70 is inserted into the aperture 45 and into the opening 18 of the transmission 12. The guide portion 38 assists the axle shaft 70 by guiding the end of the axle shaft 70 into the transmission 12. The axle shaft 70 has splines 72 on an end thereof as well as a reduced diameter portion 74 and an increased diameter portion 76. The seal protector 32, specifically the inner surface 60 of the cylindrical portion 36, protects the rubber seal portion 26 from any contact with the splines 72 as the axle shaft 70 passes into the opening 18. Once the splines 72 have passed the rubber seal portion 26 but before the increased diameter portion 76 has reached the seal protector 32, the seal protector 32 is removed, preferably by pulling on the tether 50. The seal protector 32 separates along the axial separation such that the thin portions 46A and 48A no longer overlap, and an opening is created. The seal protector 32 is able to deflect and be pulled off the axle shaft 70. The axle shaft 70 is then further inserted until the axle seal 14 seals to the increased diameter portion 76 of the axle shaft 70. It should be appreciated that the seal protector assembly 10 may be used with other seals and with other components and openings in the transmission 12 without departing from the scope of the present invention.

The description of the invention is merely exemplary in nature and variations that do not depart from the general essence of the invention are intended to be within the scope of the invention. Such variations are not to be regarded as a departure from the spirit and scope of the invention.

The following is claimed:

1. A device for covering an annular seal in an opening of a transmission, the device comprising:
    a flexible annular ring having a first end that extends radially and defines an opening coaxial with an axis and a surface that extends axially from the first end, wherein the annular ring includes first and second sides that extend axially from the first end, wherein the first and second sides overlap such that the annular ring is radially compressible and radially expandable to fit within the opening of the transmission to cover the annular seal; and
    a cap disposed at least partially within the opening of the annular ring, wherein the cap has a diameter that radially expands the annular ring to seal the surface to the annular seal.

2. The device of claim 1 wherein the cap is attached to the flexible annular ring and is removable from the opening in the first end.

3. The device of claim 2 wherein the cap is attached to the flexible annular ring by a flexible tether.

4. The device of claim 3 wherein the cap, flexible annular ring, and the flexible tether are formed as a single unitary piece.

5. The device of claim 1 wherein the flexible annular ring includes a second end opposite the first end that defines a second opening, wherein the flexible annular ring further includes a guide flange that extends axially and radially from the first end in a direction away from the second end, and wherein the second end is inserted into the opening of the transmission.

6. The device of claim 5 wherein the surface is frusto-conical having a first diameter at the opening that is greater than a second diameter at the second opening.

7. The device of claim 5 wherein the flexible annular ring includes a retaining feature disposed on the surface and located proximate the second end, wherein the retaining feature is disposed axially inward of the annular seal when the flexible annular ring is disposed within the opening of the transmission.

8. The device of claim 7 wherein the retaining feature is a protrusion on the surface.

9. The device of claim 8 wherein the protrusion extends about the circumference of the surface from the first side to the second side.

10. The device of claim 7 wherein the retaining feature is a flange that extends axially and radially from the second end in a direction away from the first end.

11. The device of claim 5 wherein the cap further includes a flange that contacts the guide flange of the flexible annular ring when the cap is inserted into the flexible annular ring.

12. The device of claim 1 wherein portions of the surface proximate the first and second sides have a thickness less than a portion of the surface between the first and second sides.

13. The device of claim 1 wherein a force to remove the cap from the opening of the flexible annular ring is less than a force to remove the flexible annular ring from the opening of the transmission.

14. The device of claim 1 wherein the flexible annular ring includes a second end opposite the first end that defines a second opening, wherein the flexible annular ring further includes a guide flange that extends axially and radially from the first end in a direction away from the second end, and wherein the second end is inserted into the opening of the transmission.

15. The device of claim 14 wherein the flexible annular ring includes a retaining feature disposed on the surface and located proximate the second end, wherein the retaining feature is disposed axially inward of the annular seal when the flexible annular ring is disposed within the opening of the transmission.

16. The device of claim 15 wherein the retaining feature is a protrusion on the surface.

17. The device of claim 14 further comprising at least one member connected to the guide flange, the member having a radially extending portion and an axially extending portion, wherein the member limits the expansion of the flexible annular ring by contacting the transmission.

18. A device for covering an annular seal in an opening of a transmission, the device comprising:
    a flexible, frusto-conical annular ring having a first end that extends radially and defines an opening coaxial with an axis and a surface that extends axially from the first end, wherein the annular ring includes first and second sides that define a break that extends axially through the first end and the surface, wherein the first and second sides overlap such that the annular ring is compressible and expandable and is sized to fit within the opening of the transmission to cover the annular seal; and
    a cap attached to the flexible annular ring by a flexible tether, wherein the cap is disposed at least partially within the opening of the annular ring, wherein the cap has a diameter that radially expands the annular ring to seal the surface to the annular seal.

19. The device of claim 18 wherein the cap, flexible annular ring, and the flexible tether are formed as a single unitary piece.

* * * * *